US008818935B2

(12) United States Patent  (10) Patent No.: US 8,818,935 B2
Reisdorf  (45) Date of Patent: Aug. 26, 2014

(54) COLLABORATIVE DATA MANAGEMENT SYSTEM FOR ENGINEERING DESIGN AND CONSTRUCTION PROJECTS

(75) Inventor: Matthew John Reisdorf, Houston, TX (US)

(73) Assignee: Fluor Technologies Corporation, Aliso Viejo, CA (US)

(*) Notice: Subject to any disclaimer, the term of this patent is extended or adjusted under 35 U.S.C. 154(b) by 0 days.

(21) Appl. No.: 13/301,603

(22) Filed: Nov. 21, 2011

(65) Prior Publication Data
US 2013/0132334 A1 May 23, 2013

(51) Int. Cl.
*G06F 17/30* (2006.01)

(52) U.S. Cl.
USPC ............ 707/609; 707/610; 707/611; 707/620

(58) Field of Classification Search
USPC ................................. 707/609, 610, 611, 620
See application file for complete search history.

(56) References Cited

U.S. PATENT DOCUMENTS

| | | | |
|---|---|---|---|
| 5,220,657 A | 6/1993 | Bly et al. | |
| 5,438,661 A | 8/1995 | Ogawa | |
| 5,548,506 A | 8/1996 | Srinivasan | |
| 6,088,702 A | 7/2000 | Plantz et al. | |
| 6,356,897 B1 | 3/2002 | Gusack | |
| 6,647,305 B1* | 11/2003 | Bigelow | 700/97 |
| 7,165,041 B1 | 1/2007 | Guheen et al. | |
| 7,386,535 B1* | 6/2008 | Kalucha et al. | 1/1 |
| 7,386,797 B1 | 6/2008 | Chatterjee et al. | |
| 7,484,183 B2 | 1/2009 | Look et al. | |
| 7,769,614 B2 | 8/2010 | Eichstaedt et al. | |
| 7,797,381 B2 | 9/2010 | Zhang et al. | |
| 7,958,185 B2 | 6/2011 | Rothermel | |
| 7,962,512 B1 | 6/2011 | Sholtis et al. | |
| 2001/0013072 A1* | 8/2001 | Okada et al. | 709/315 |
| 2003/0167281 A1* | 9/2003 | Cohen et al. | 707/103 R |

(Continued)

FOREIGN PATENT DOCUMENTS

| | | |
|---|---|---|
| EP | 1422901 | 5/2004 |
| GB | 2399663 | 5/2005 |
| WO | 2004/015897 | 2/2004 |

OTHER PUBLICATIONS

Technews, "Bentley introduces Internet strategy for engineering, construction and operations networks", CG (Computer Graphics), Jun./Jul. 2000, http://cgweb.co.za/article.aspx?pklarticleid=660, last visited Feb. 20, 2012.

(Continued)

*Primary Examiner* — Hanh Thai
(74) *Attorney, Agent, or Firm* — Fish & Tsang, LLP

(57) ABSTRACT

A collaborative data management system for engineering, design, and construction (EDC) projects is presented. The system includes a storage medium, a processor, executable code, a display, and an input device. The storage medium stores a plurality of EDC data objects and a plurality of relationship objects. The EDC data objects represent parameters relevant to EDC projects. The relationship objects represent relationships between EDC data objects. The processor and executable code are communicatively coupled with the storage medium and are configured to (i) display the relationship objects on the display and (ii) allow a user to manage synchronization of the EDC objects with the input device.

21 Claims, 9 Drawing Sheets

Table 500

| Relationship Object | First EDC Object | | | Relationship Type | Second EDC Object | | | Synchronization Status |
|---|---|---|---|---|---|---|---|---|
| | Number | Current Value | Life-Cycle | | Number | Current Value | Life-Cycle | |
| 331 | 311 | 38.4 m | Engineering | Match (311 = 321) | 321 | 34.3 m | Engineering | Conflict |
| 332 | 312 | .68 m² | Design | Function (312 = π322²) A = πr² | 322 | .48 m | Design | Conflict |
| 333 | 313 | 5 m | Design | Match (313 = 322) | 322 | 4.8 m | Engineering | Conflict |
| 334 | 323 | 4.8 m | Design | Match (323 = 322) | 322 | 4.8 m | Engineering | Synchronized |
| 345 | 314 | 2,000 V | Engineering | Function (314 = 325*324) V = IR | 324 | 100 Ω | Design | Synchronized |
| 346 | 315 | 2.00 μΩ | Design | Function (315 = 328 * 317/312) R = ρ * l/A | 317 | 5.4 m | Construction | Conflict |
| 347 | 327 | 20.0 A | Engineering | Match (326 = 325) | 325 | 20.0 A | Engineering | Synchronized |
| 348 | 319 | 8 m³/s | Construction | Function (319 = 318*0.25) | 318 | 25 m³/s | Design | Conflict |
| 349 | 319 | 8 m³/s | Construction | Match (319 = 329) | 329 | 8 m³/s | Construction | Synchronized |

(56) References Cited

U.S. PATENT DOCUMENTS

| | | | |
|---|---|---|---|
| 2005/0065951 A1* | 3/2005 | Liston et al. | 707/101 |
| 2007/0112819 A1 | 5/2007 | Dettinger et al. | |
| 2007/0136662 A1* | 6/2007 | Khaba | 715/530 |
| 2007/0271587 A1* | 11/2007 | Rowe | 725/109 |
| 2008/0091682 A1* | 4/2008 | Lim | 707/9 |
| 2008/0120129 A1* | 5/2008 | Seubert et al. | 705/1 |
| 2008/0234987 A1* | 9/2008 | Haley | 703/1 |
| 2009/0083314 A1* | 3/2009 | Maim | 707/103 R |
| 2009/0326988 A1* | 12/2009 | Barth et al. | 705/4 |
| 2011/0161824 A1* | 6/2011 | Coldefy et al. | 715/735 |
| 2011/0225293 A1* | 9/2011 | Rathod | 709/224 |
| 2011/0251868 A1* | 10/2011 | Mikurak | 705/7.25 |
| 2011/0276360 A1* | 11/2011 | Barth et al. | 705/7.23 |
| 2011/0307360 A1* | 12/2011 | Duparc et al. | 705/32 |
| 2012/0017000 A1* | 1/2012 | Lim | 709/229 |

OTHER PUBLICATIONS

"Aspen Basic Engineering—Delivers significant improvements in productivity, agility and time-to-delivery in basic", Aspen Tech, 2011, http://www.apentech.com/core/zyqad.aspx, last visited Feb. 20, 2012.

"Bentley AXSYS(R).Process V8i—Front-End Engineering Design for Process Engineering", Bentley.com, 2012, http://www.bentley.com/en-US/Products/Bentley+AXSYS+Process/, last visited Feb. 20, 2012.

"COMOS Platform—The software basis for object-oriented, world-wide consistent data management", Seimens.com, 2012, http://www.automation.siemens.com/mcms/plant-engineering-software/en/comos-platform/Pages/Default.aspx, last visited Feb. 20, 2012.

"SmartPlant(R) Foundation", Intergraph Corporation, 2010, http://www.intergraph.com/products/ppm/smartplan/foundation/default.aspx, last visted Feb. 20, 2012.

* cited by examiner

Table 400

| Relationship Object | First EDC Object | Relationship Type | Second EDC Object | Synchronization Status |
|---|---|---|---|---|
| 331 | 311 | Match (311 = 321) | 321 | Conflict |
| 332 | 312 | Function (312 = π322$^2$) $A = \pi r^2$ | 322 | Conflict |
| 333 | 313 | Match (313 = 322) | 322 | Conflict |
| 334 | 323 | Match (323 = 322) | 322 | Synchronized |
| 345 | 314 | Function (314 = 325*324) $V = IR$ | 324 | Synchronized |
| 346 | 315 | Function (315 = 328 * 317/312) $R = p * l/A$ | 317 | Conflict |
| 347 | 326 | Match (326 = 325) | 325 | Synchronized |
| 348 | 319 | Function (319 = 318*0.25) | 318 | Conflict |
| 349 | 319 | Match (319 = 329) | 329 | Synchronized |

Figure 4

| Relationship Object | First EDC Object | | | Relationship Type | Second EDC Object | | | Synchronization Status |
|---|---|---|---|---|---|---|---|---|
| | Number | Current Value | Life-Cycle | | Number | Current Value | Life-Cycle | |
| 331 | 311 | 38.4 m | Engineering | Match (311 = 321) | 321 | 34.3 m | Engineering | Conflict |
| 332 | 312 | .68 m$^2$ | Design | Function (312 = π322$^2$) A = πr$^2$ | 322 | .48 m | Design | Conflict |
| 333 | 313 | 5 m | Design | Match (313 = 322) | 322 | 4.8 m | Engineering | Conflict |
| 334 | 323 | 4.8 m | Design | Match (323 = 322) | 322 | 4.8 m | Engineering | Synchronized |
| 345 | 314 | 2,000 V | Engineering | Function (314 = 325*324) V = IR | 324 | 100 Ω | Design | Synchronized |
| 346 | 315 | 2.00 μΩ | Design | Function (315 = 328 * 317/312) R = ρ * l/A | 317 | 5.4 m | Construction | Conflict |
| 347 | 327 | 20.0 A | Engineering | Match (326 = 325) | 325 | 20.0 A | Engineering | Synchronized |
| 348 | 319 | 8 m$^3$/s | Construction | Function (319 = 318*0.25) | 318 | 25 m$^3$/s | Design | Conflict |
| 349 | 319 | 8 m$^3$/s | Construction | Match (319 = 329) | 329 | 8 m$^3$/s | Construction | Synchronized |

Table 500

Figure 5

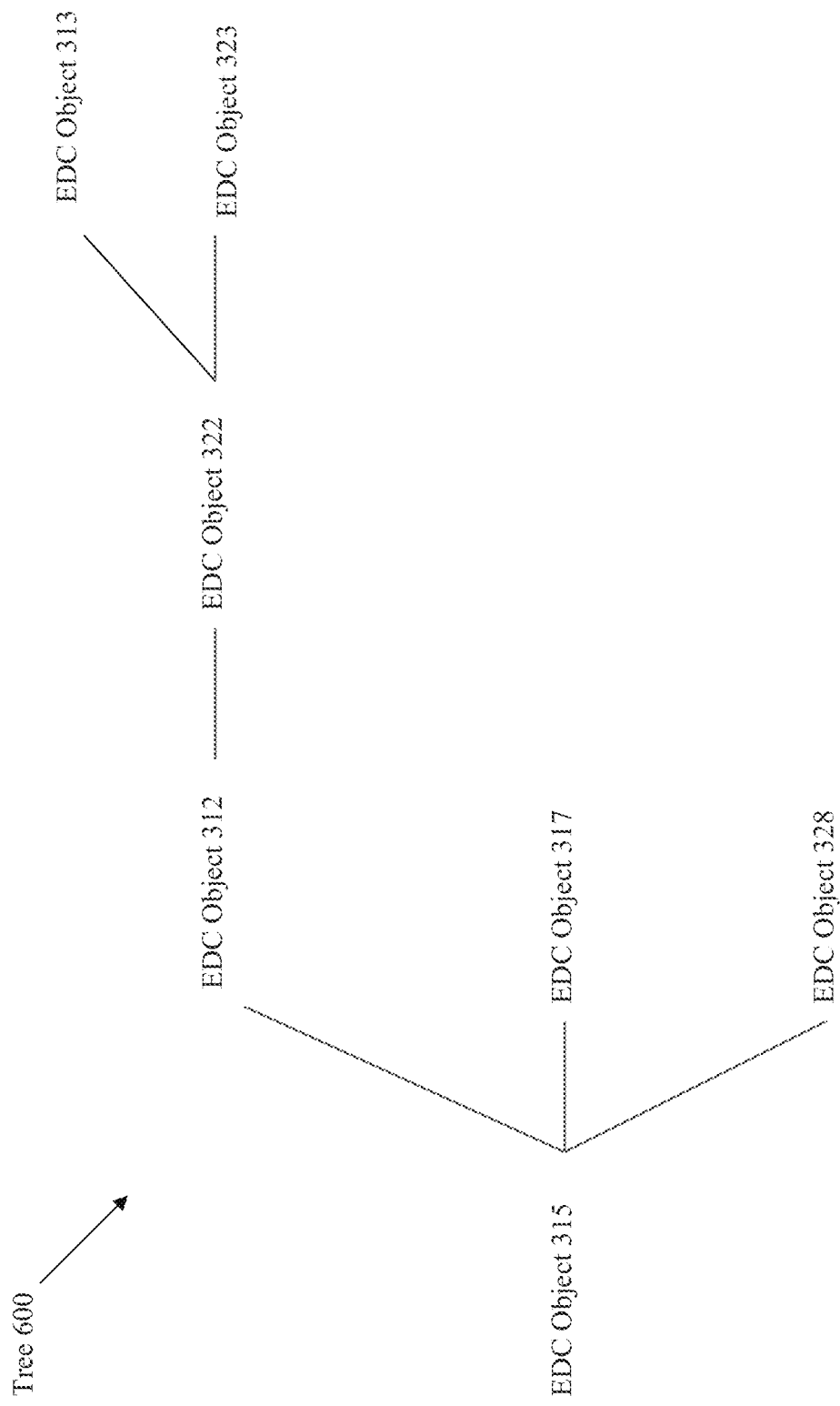

US 8,818,935 B2

COLLABORATIVE DATA MANAGEMENT SYSTEM FOR ENGINEERING DESIGN AND CONSTRUCTION PROJECTS

FIELD OF THE INVENTION

The field of the invention is databases and data management.

BACKGROUND

With the growth of the interact and technology, shared workspaces have expanded to a global level. Collaborative databases are now a part of most work environments, allowing co-workers to exchange data quickly and work together on large-scale projects, irrespective of their geographical location. Numerous software technologies have been developed to help facilitate this collaboration by managing data more efficiently and providing additional functionality.

U.S. Pat. No. 7,958,185 to Rothermel, for example, discloses a collaborative data management system for engineering, construction, and operations (ECO) projects. The system controls how data is stored, shared, and synchronized, and automatically tracks prior edits of documents and files (i.e., "version control"). The system is also capable of incorporating geospatial data, such as computer-aided design (CAD) models, with text data.

Rothermel, and all other extrinsic materials discussed herein, are incorporated by reference in their entirety. Where a definition or use of a term in an incorporated reference is inconsistent or contrary to the definition of that term provided herein, the definition of that term provided herein applies and the definition of that term in the reference does not apply.

U.S. Pat. No. 7,769,614 to Eichstaedt also discloses a collaborative database system for the design, construction, and maintenance of fluid processing plants. The system includes version control, automatic notifications, security features, and access controls. The system also provides simultaneous display of changes, allowing two or more users at separate locations to view changes in a document as they are made in real time.

U.S. Pat. No. 5,220,657 to Bly discloses a networked workstation that allows for collaborative project management. Specifically, Bly addresses the need for participants to be able to work simultaneously, making changes to the same document. Bly also allows for tracking of simultaneous changes and collects a history of previous versions of a document in order to track how the document has changed over time. Bly also allows a user to monitor activities of other users.

U.S. Pat. No. 6,088,702 to Plantz discloses a group publishing system that allows an unlimited number of editors and authors to simultaneously perform word processing, document assembly, and editing functions to the same document, without having to store duplicates of documents.

Other patents and patent applications include: U.S. Pat. Nos. 5,438,661, 5,548,506, 6,356,897, 7,797,381, 7,962,512, and US20070112819.

In addition, various commercial products for collaborative data management are available on the market. See, for example, www.viecon.com, www.aspentech.com ("Aspen Basic Engineering"), www.bently.com ("Axsys"), and www.intergraph.com ("SmartPlant Foundation"), and www.cosmos.com ("Innotec Cosmos").

All of these references fail to provide a collaborative data management system that allows a user to define when and how data is synchronized. While conflict resolution and data synchronization problems have been appreciated, solutions generally rely on "source files" and "destination files." This structure provides little flexibility and customization with how data is synchronized.

U.S. Pat. No. 7,386,797 to Chatterjee discloses methods and systems for managing business projects. The business projects include parallel/concurrent processes that are performed in isolation of each other, and then merged at a later point in time. The merge (i.e., synchronization) can be manual or by predefined rules. Furthermore, Chatterjee discloses tracking the life cycle of the project by identifying a "status" (e.g., start, begin, end). Data content can be "frozen" (i.e., the data can no longer be modified) once a project phase has ended. GB2399663 to Sandoz also discloses resolving conflicts either by predetermined rules, or by a user's instructions. Both Sandoz and Chatterjee tint to disclose a collaborative data management system that allows users to work independently and allows supervising users to merge/synchronize data in a highly controlled and flexible manner.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Thus, there is still a need for improved collaborative data management systems.

SUMMARY OF THE INVENTION

The inventive subject matter provides apparatus, systems, and methods in which a collaborative data management system for engineering, design, and construction (EDC) projects provides flexibility and customization with how project data is related and synchronized. The system includes a computer (i.e., storage medium, processor, display, input device) and especially configured executable code.

The storage medium stores a plurality of EDC data objects and plurality of relationship objects. The EDC data objects represent parameters relevant to EDC projects. The relationship objects represent relationships between EDC data objects. The processor and executable code are communicatively coupled with the storage medium and are configured to (i) display the relationship objects on the display and (ii) allow a user to manage synchronization of the EDC objects with the input device. In some embodiments, the storage medium is distributed (e.g., two or more servers connected via a network) and preferably load balanced. In addition, the storage medium is preferably accessible via a wide area network (e.g., the internet).

The EDC data objects can represent computer automated design (CAD) drawings, cost calculations, time calculations, design parameters, construction parameters, materials, work personnel, design engineers, vendors, and equipment. EDC data object could also represent metadata of other EDC data objects, such as: date created, date last modified, user responsible for last modification, life-cycle phase, and synchronization status. The EDC data objects are preferably stored in a standard format that is compatible with numerous software applications, allowing various users to view and modify the objects without the need for specific/custom software. The EDC data objects can be stored and organized in one file, or alternatively, across a number of files.

The relationship objects can functional relationships (e.g., first data object d relates to a second data object r by the formula $d=\pi r^2$) and/or matching relationships (e.g., $d=r$). In some embodiments, the relationship objects change over time as a function of a metadata object that represents a life-cycle phase of one of the plurality of EDC data objects.

The executable code is configured to display the plurality of relationship objects, preferably in various formats (e.g., tree, table, etc.). The executable code is also configured to identify and display a synchronization status related to a relationship object (e.g., "synchronized" or "conflict"). In other aspects, the a executable code is configured to track and display prior revisions of the EDC data objects. In yet other aspects of preferred embodiments, the executable code is configured to modify the relationship data objects as a function of the project's life cycle.

Various objects, features, aspects, and advantages of the inventive subject matter will become more apparent from the following detailed description of preferred embodiments, along with the accompanying drawing figures in which like numerals represent like components.

BRIEF DESCRIPTION OF THE DRAWING

FIG. 4 is one embodiment of a table for displaying and managing relationship objects.

FIG. 5 is another embodiment of a table for displaying and managing relationship objects.

FIG. 6 is one embodiment of a tree structure for displaying and managing relationship objects.

DETAILED DESCRIPTION

It should be noted that while the following description is drawn to a computer/server based data management system, various alternative configurations are also deemed suitable and may employ various computing devices including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including greater control and flexibility for data synchronization.

Figure 1:
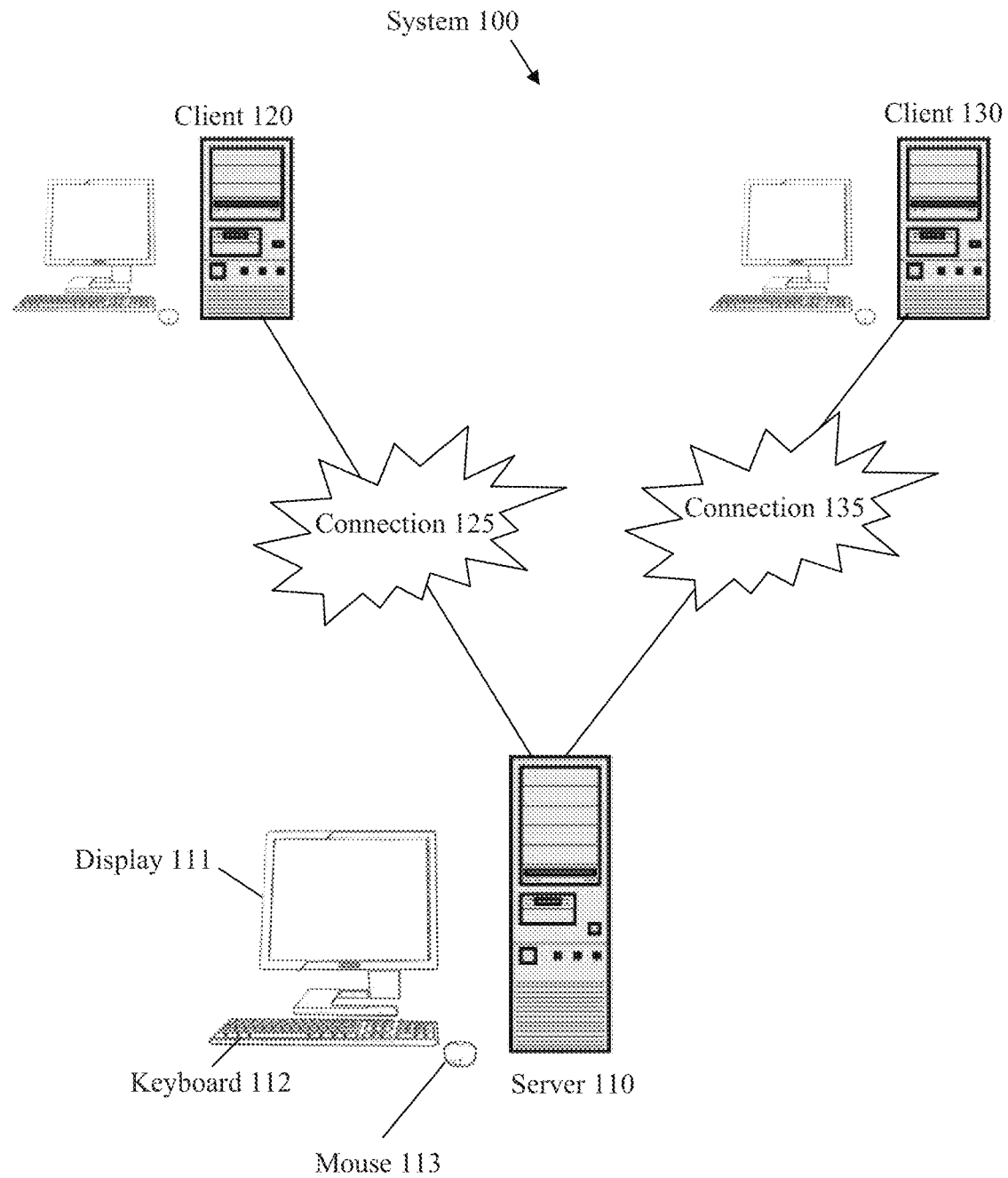
FIG. 1 is a schematic of one embodiment of a collaborative data management system.

FIG. 1 shows a collaborative data management system 100. System 100 includes a server 110 communicatively coupled with clients 120 and 130. Server 110 internally includes a storage medium, processor, and executable code (not shown). Server 110 also has a display 111, keyboard 112, and mouse 113. Clients 120 and 130 also have similar components and features. Clients 120 and 130 are communicatively coupled with server 110 via connections 125 and 135, respectively.

Connections 125 and 135 can comprise a packet-switched network, the Internet, LAN, WAN, VPN, wireless network, or other type of packet switched network. Connections 125 and 135 are preferably secured communication links (e.g., protected by encryption and/or authentication). In addition, server 110 preferably stores data with encryption and access is protected by authentication protocols. It is also contemplated that server 110 can have a hierarchy of rights and permissions for user access, according to known database management techniques. While system 100 only shows two clients, more than two clients are contemplated.

Monitor Display 111, keyboard 112, and mouse 113 are located within close proximity of server 110 and allow a user or administrator to manage server 110. It is also contemplated that display 111, keyboard 112, and mouse 113 could be located remotely with respect to server 110 (e.g., connected via the internet). Other display and input devices are also contemplated and can be used consistently with the inventive concepts discussed herein. For example, server 110 can include an LCD touch screen, or a microphone and voice recognition software.

Figure 2:
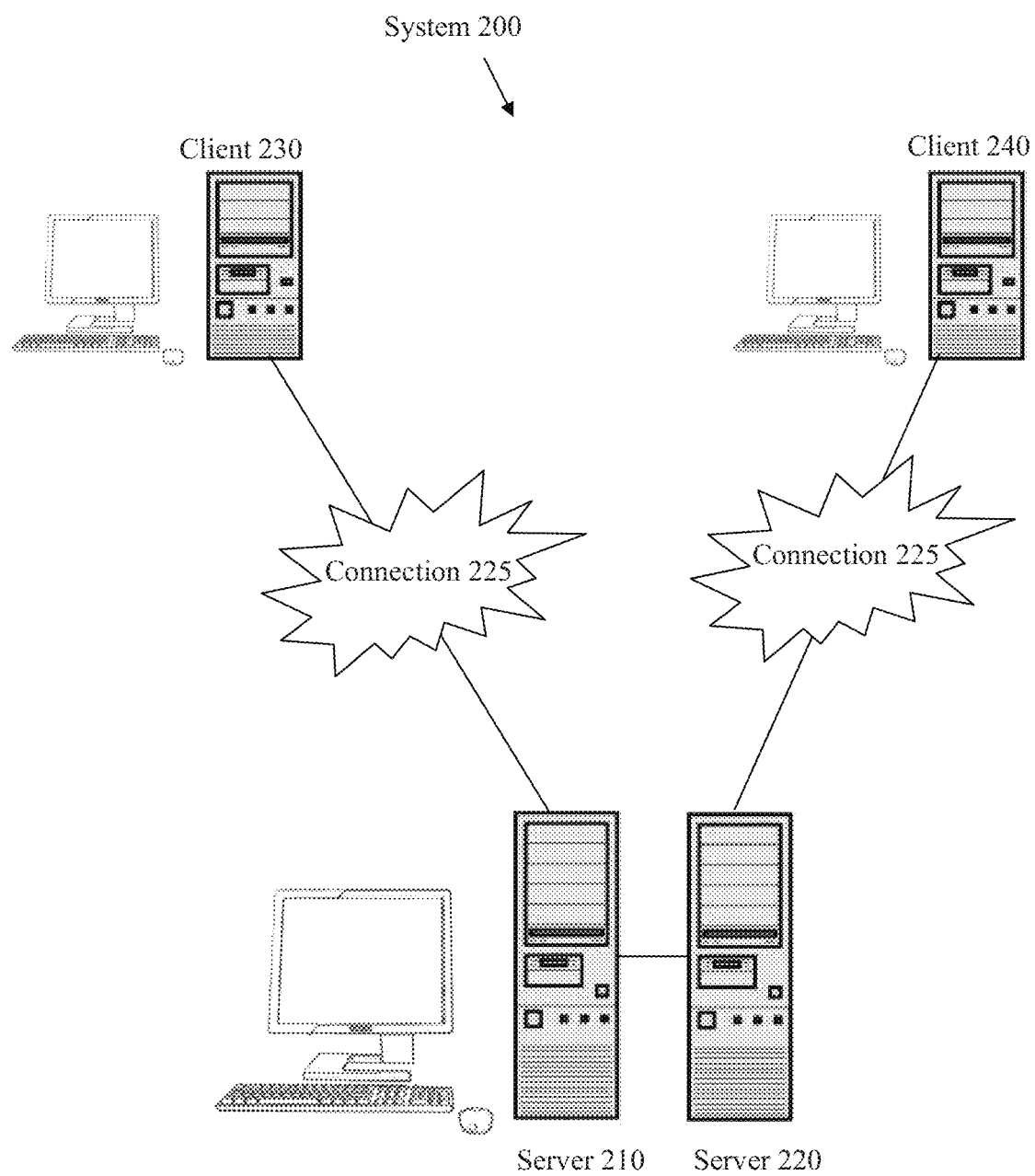
FIG. 2 is a schematic of another embodiment of a collaborative data management system.

FIG. 2 shows a collaborative data management system 200. System 200 is similar to system 100, except that system 200 includes a distributed database (i.e., servers 210 and 220). Distributed databases are well known and provide numerous advantages such as greater storage capacity, greater load capacity, and redundancy. Servers 210 and 220 are communicatively coupled (e.g., internet, wireless, WAN, LAN) and preferably include executable code for optimizing load distribution. One of skill in the art will appreciate that various configurations of servers and clients can be used consistently with the inventive subject matter disclosed herein.

Figure 3:
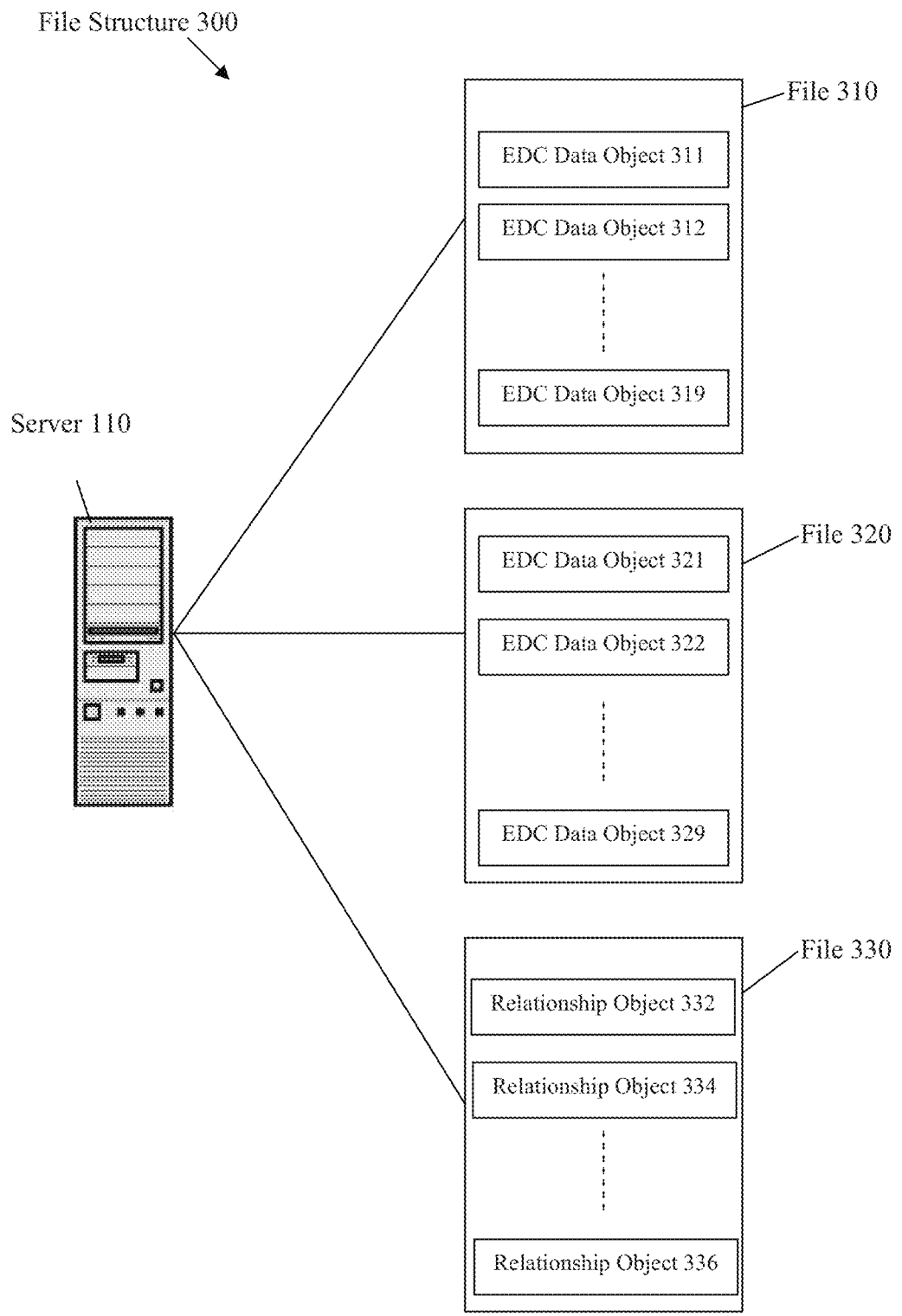
FIG. 3 is a schematic of a file structure of a server for the collaborative data management system of FIG. 1.

FIG. 3 shows server 110 storing a file object 310, a file object 320, and a file object 330. File objects 310, 320, and 330 can comprise a word document, excel document, computer-aided design (CAD) drawing file, or any other format for storing and displaying electronic representations of real-life EDC data.

Files 310 and 320 each include a plurality of EDC objects. EDC objects represent real-life data, parameters, and/or values related to EDC projects. For example, EDC objects can include: CAD drawing data, cost/budget calculations, time/schedule calculations, design parameters (e.g., dimensions, power consumption, weight, flow rate, pressure, temperature), construction parameters, materials, work personnel, design engineers, vendors, and equipment specifications. Files 310 and 320 are preferably stored in standardized formats that are compatible with multiple software viewing applications for greater compatibility.

File 330 includes a plurality of relationship objects. Relationship objects represent real-life relationships (i.e., links) between two or more EDC objects. For example, the relationship can be a requirement that two objects "match," meaning the two objects represent the same real-life parameter or value. Alternatively, the relationship can be functional, meaning that two objects are related by a formula or function. For example, two objects can have a proportional/percentage relationship or can be related by a known physical relationship (e.g., area of a circle equals radius squared times pi, voltage equals current times resistance).

Server 110 provides a useful system for collaborative data management during EDC projects. By storing two or more EDC data objects that represent the same parameter in real-life, different users (engineers, project managers, architectures) can work independently by assigning different values to the real-life parameter, according to their specific task, schedule, and sub-project requirements. Changes to the first object value by one user will not automatically change the value of the second EDC data object. At the same time, server 110 advantageously allows for collaboration since relationship objects that describe all related/linked data are stored in file 330. The contents of file 330 can be displayed to a user who can make conscious and intelligent decisions regarding conflict resolution and data synchronization. For example, a project manager can view all "conflicts," (e.g., EDC data objects that should be matching but are not currently matching) and decide when and how to synchronize the data objects. The project manager can also review all the consequences of synchronizing the first and second EDC data objects by viewing all related/linked EDC objects. The project manager may decide to assign various data management decisions to other users that are more qualified to make the decision. Examples of data management decisions include (i) when to synchronize data objects, and (ii) which EDC object is the "primary" object (i.e., the data object that will control the values of other related/linked data objects).

Each EDC data object and/or relationship object can include related metadata, such as: date the object was created, user who created the object, date the object was last modified, life-cycle phase (e.g., engineering, design, construction), other data objects having a relation or link with the data object and their relationship type, synchronization status, the designated primary data object, and a history/log of the previous versions/values of the data objects.

One of skill in the art will appreciate that various configurations of file structures and hierarchies can be used consistently with the inventive subject matter disclosed herein. For example, the relationship objects can be stored on server 110 in multiple files, and the processor and executable code can be configured to display all relationship objects as if they were stored in a single location (e.g., all relationship objects are displayed to a user in a single interface on a monitor screen). Moreover, the EDC data objects can either be stored in a single file within server 110, or on multiple files within server 110. EDC objects and relationship objects can also be stored together on the same files.

The executable code can also be configured to modify the relationship data objects as a function of the project's life cycle. For example, the executable code could define a relationship data object as a 1-to-1 match between two EDC data objects during the design stage, and then define the relationship object as a function (e.g., two data objects are related by a coefficient other than 1) during the construction stage. As another example, when the relationship data represents a priority between two data objects (e.g., a first data object controls the value of a second data object), the executable code could define the priority as a function of the life-cycle (e.g., the first data object has higher priority during the design stage, and the second data object has higher priority during the construction stage). In this manner, system 300 allows a user to define relationships between project data as a function of the project's life-cycle stages.

FIG. 4 shows a table 400 for displaying the contents of file 330 via display 111. Table 400 lists all relationship objects stored within server 110, including their synchronization status (e.g., "conflict," "synchronized"). Table 400 also shows the two EDC objects (i.e., "First EDC Object," and "Second EDC Object") that each relationship object describes, and the relationship type. The relationship type is either a "matching" relationship (i.e., first and second EDC object represent the same real-life parameter) or a "functional" relationship (i.e., first and second EDC objects are related by a formula). While the relationship objects in table 400 only describe a relationship between two EDC data objects, one of skill in the art will appreciate that a relationship object could describe relationships between three or more EDC data objects. However, system 100 has been structured such that one every relationship object stored on server 110 describes a relationship between a pair of related EDC data objects. Where an EDC data object has a relationship with two or more other EDC objects, each pair-relationship is represented by a separate relationship object.

Table 400 can include additional columns for displaying the current value of each EDC object. Columns can also be included to display metadata associated with each relationship object and EDC object, for example: date EDC object was created, date of most recent change to an EDC object, the user who made the most recent change, and notes/comments of why it the change was made. Table 400 can also include columns for displaying all previous changes to each EDC object. In this manner, table 400 not only provides a convenient means for managing and resolving conflicts, but also provides a means for tracking revisions. Alternatively, metadata can be displayed by mousing over an EDC object to trigger the display of a new window.

Table 400 can also include a column showing the file name and file location where the EDC data object is stored. The column can optionally include a hyperlink that opens the file when clicked. The link preferably operates to open the file at the specific location where the EDC data object is located (e.g., page, paragraph). When table 400 includes a column for displaying the current values of the EDC objects, a user can preferably update the values by typing in a new value, which operates to store the updated value in the EDC object's source location.

Table 400 also provides an interface for creating new relationship objects. A user can enter a new row and choose a first and second EDC object to be related, and define a relationship type. It is also contemplated that new relationship objects can be created using an interface that displays files 310 and 320. When a new relationship is established via an interface displaying file 310 or file 320, the new relationship is preferably added to table 400 (e.g., stored in file 330) automatically. One of skill in the art will appreciate that many different interfaces and functions can be used consistently with the inventive concepts disclosed herein. For example, an interface having drag/drop features and drop-down menu selections can be provided to allow a user create and manage the relationship objects and EDC data objects.

The processor and executable code of server 110 are preferably configured to allow notification of conflicts to different user. For example, project managers can be notified via email (or via on-screen messages displayed within table 400) whenever a new conflict needs to be resolved.

FIG. 5 shows a table 600, which is similar to table 500, except that table 600 has additional columns showing current values and fife-cycles for each EDC object. Displaying current values of all the linked EDC objects advantageously allows a user to quickly determine the severity/degree of a conflict by comparing the current values. The user can then decide whether to resolve the conflict, and how the conflict should be resolved. The user may decide to assign the decision to another user.

Table 600 is a master list of every relationship object stored on server 110. A project manager can readily manage the collaboration and synchronization of data for an entire project from a single interface or file. The processor and executable code additionally provides the project manager with an ability to create subsets of relationship objects. The manager can then assign each subset to a qualified engineer to determine or suggest a conflict resolution. The engineer could recommend whether a conflict should be resolved, when the conflict should be resolved (e.g., after engineering phase is completed, after design phase is completed, before construction of a particular building), and which EDC data object should be the primary object (or whether a new value for the EDC data objects should be supplied). The engineer can base his decision on expertise, and/or metadata. For example, the engineer can consider who made the last change to an EDC object, when the change was made, why the change was made, and whether certain real-life construction limitations or cost limitations necessitate one particular resolution over another.

FIG. 6 shows a tree 600 for relationship objects. Tree 600 has a plurality of EDC objects linked by lines. Each line represents a relationship object. Tree 600 could further include a label for each line, indentifying the relationship object number and relationship type. The lines could also be color-coded (e.g., red to signify conflicts and black to signify synchronized). Each line could include labels containing relevant metadata. Alternatively, metadata could be displayed on after mousing over the EDC data object. Furthermore, the "primary data objects" (those that have been designated as the controlling data object) can be designated by using bold font letters, unique colors, labels, or some other identifier.

Tree 600 merely represents one of multiple "relationship trees" that are defined by the plurality of relationship objects in file 330. Server 110 is configured to display all relationship trees defined by the plurality of relationship objects. A tree layout advantageously provides a visual means for identifying all linked data objects and how a decision to synchronize one data object with another will affect all related data objects.

Tree 600 also provides an interface for creating new EDC data objects and relationship objects. A user, such as a project manager, can create new relationship objects and define relationship types, EDC object values, and designate the "primary" EDC data objects from within tree 600. Tree 600 also provides an visual for defining and/or viewing priority designations of primary and secondary data objects (e.g., object 315 is controlling of object 312, object 312 is controlling of object 322, object 322 is controlling of object 323). As used herein, "priority designations" merely refers to a predetermined preference for (primary data objects. The priority designation does not necessarily indicate that automatic synchronization wilt occur, unless an authorized user has specifically configured the relationship object to automatically synchronize.

The processor and executable code of server 110 are configured to allow a user to configure synchronization settings for every relationship object. For example, a user can set one relationship object to automatically synchronize every time one of its two linked EDC data objects is modified. In contract, the user can set a different relationship object to synchronize only by direct input from a particular user or only upon completion of milestones such as completion of engineering or design phase. In this manner, server 110 aids large scale collaborative project management by providing a highly flexible collaborative data management system.

Figure 7:
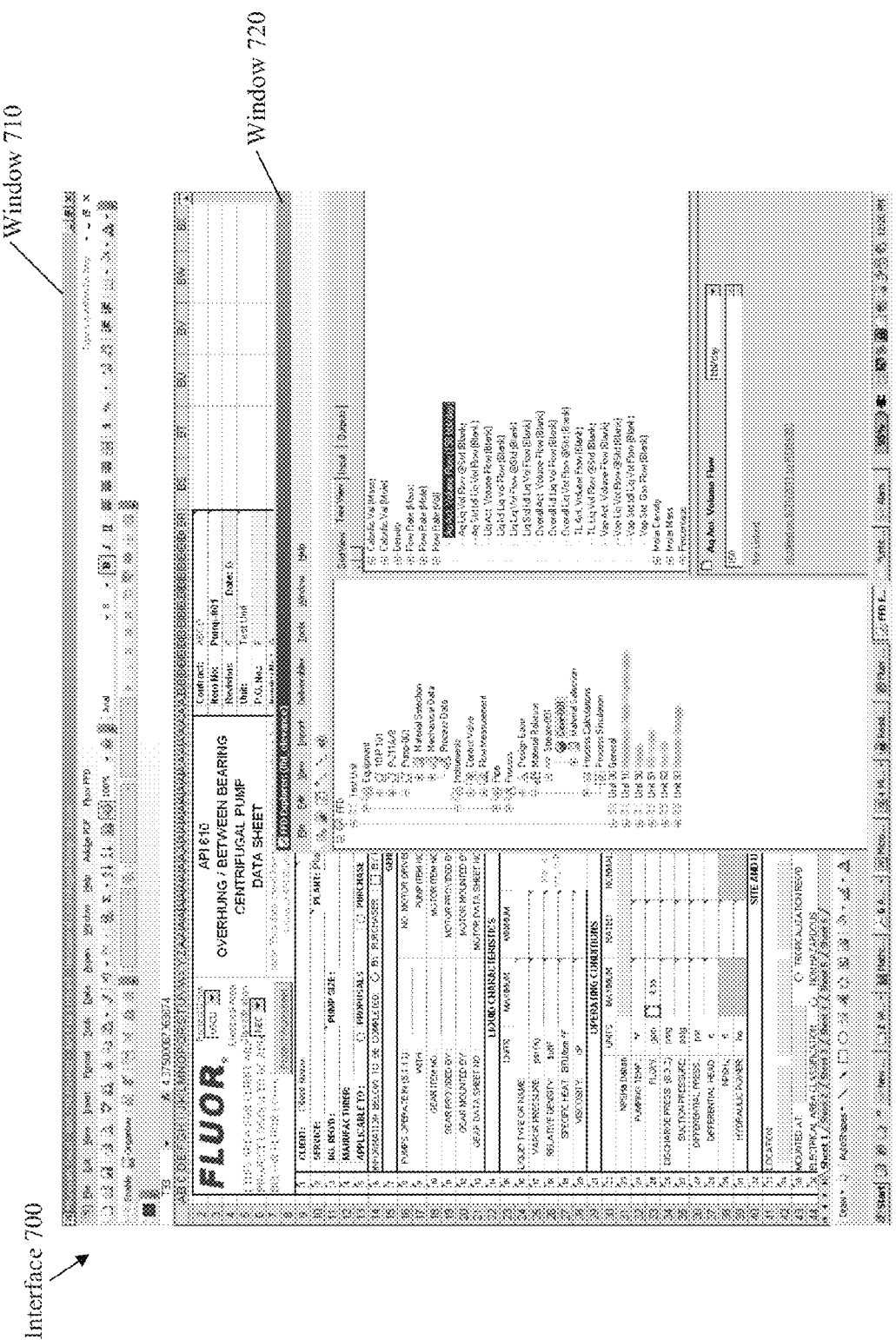
FIG. 7 shows an interface for establishing data links via drag-and-drop functionality.

FIG. 7 shows an interface 700 having a first window 710 and a second window 720. Window 710 displays a data sheet for a centrifugal pump. Window 710 shows various data related to the centrifugal pump that can be used during engineering, design, and construction phases of a project. The data shown in window 710 are stored on as EDC data objects on a storage medium similar to server 110. Window 720 shows various relationships and links between the data, which can be displayed in either a grid or a tree format. Window 720 provides an interface for reviewing and managing relationships between data. Specifically, windows 720 allows a user establish and/or modify relationships via a drag-and-drop function.

Figure 8:
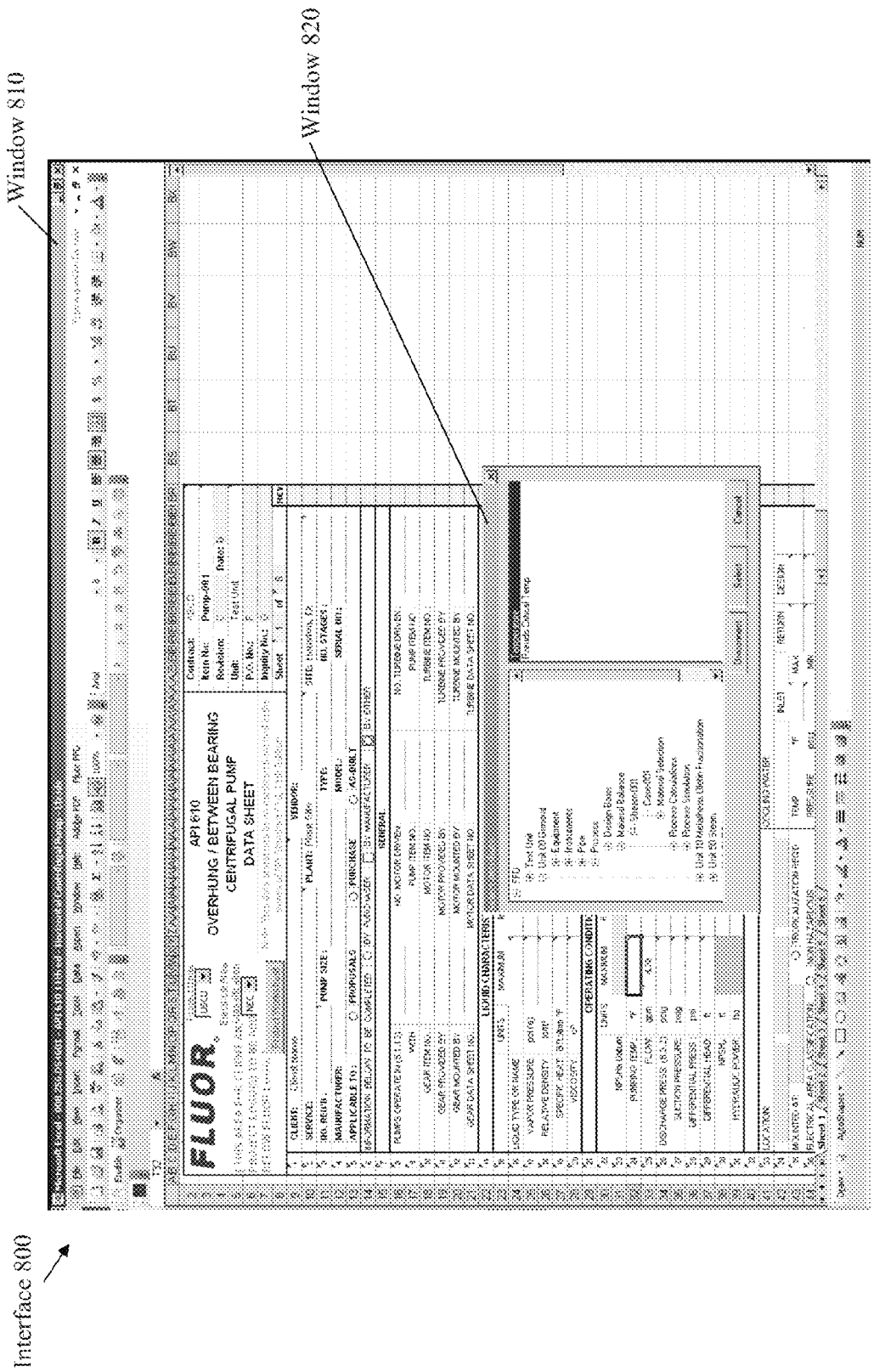
FIG. 8 shows an interface for establishing data links via a menu selection.

FIG. 8 shows an interface 800 having a first window 810 and a second window 820. Window 810 is similar to window 710. Window 820, however, provides a menu selection rather than a drag-and-drop function, in order to establish and modify data relationships.

Figure 9:
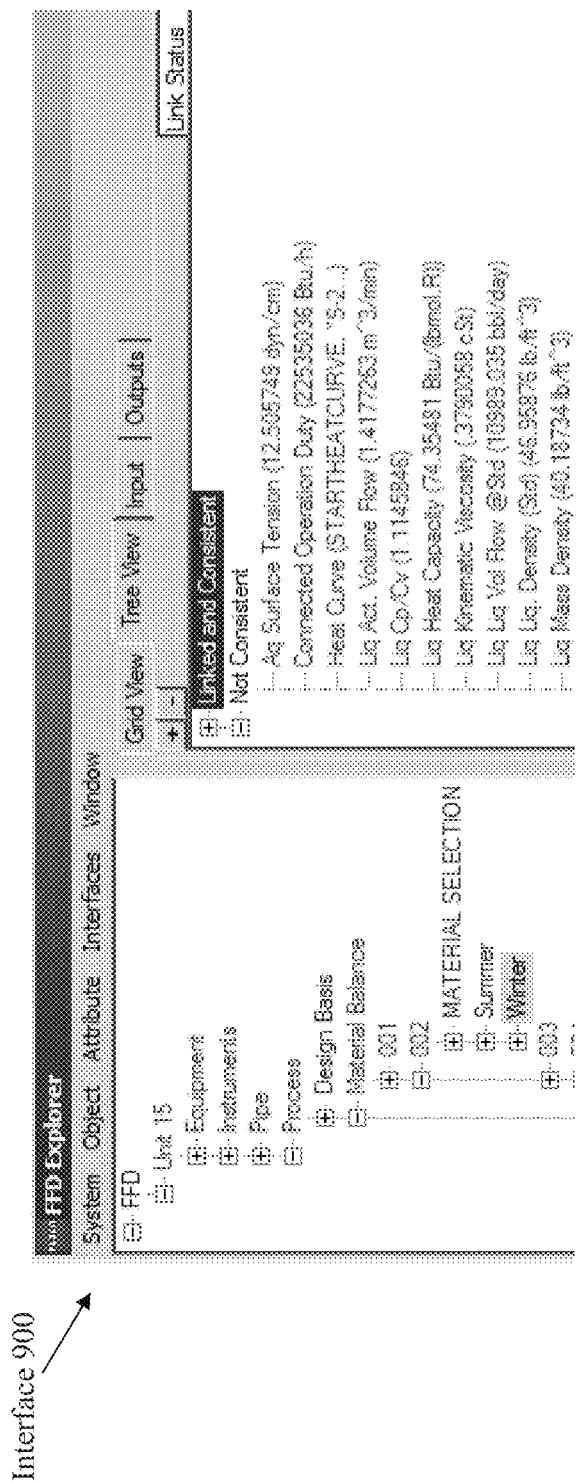
FIG. 9 shows an interface for displaying conflicts.

FIG. 9 shows an interface 900 for displaying conflicts. Conflicting data objects are highlighted in red white linked and consistent data are colored blue. Interface 900 can display conflicts in either a grid or a tree format. Interface 900 allows a user to review all the relationship on a server or system, regardless of whether the data is stored in the same file. In this manner, interface 900 allows a user to manage conflicting data across an entire server or network.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A collaborative data management system for engineering, design, and construction (EDC) projects, comprising:

a storage medium storing a plurality of EDC data objects and a plurality of relationship objects;

wherein each of the relationship objects represents a relationship between ones of the plurality of EDC data objects;

wherein the plurality of EDC data objects includes:
  (i) a first EDC data object that represents a first value for a first parameter, the first value defined by a first user; and
  (ii) a second EDC data object that represents a second value for the first parameter, the second value defined by a second user;
wherein the plurality of relationship objects includes a first relationship object that represents a priority relationship between the first EDC data object and the second EDC data object, wherein the priority relationship is defined as a function of a life-cycle phase of an EDC project;
a processor communicatively coupled with the storage medium;
a display and input device communicatively coupled with the processor; and
executable code communicatively coupled with the processor and configured to:
  (i) display the plurality of relationship objects on the display;
  (ii) allow a user to manage synchronization of the EDC objects with the input device; and
  (iii) redefine the first relationship object during the life-cycle of the EDC project.

2. The system of claim 1, wherein the storage medium is distributed.

3. The system of claim 2, wherein the distributed storage medium is load balanced.

4. The system of claim 1, wherein the storage medium is accessible via a wide area network.

5. The system of claim 1, wherein the plurality of EDC data objects represent computer automated design (CAD) drawings, cost calculations, time calculations, design parameters, construction parameters, materials, work personnel, design engineers, vendors, and equipment.

6. The system of claim 1, wherein the plurality of EDC data objects are stored in a standard format.

7. The system of claim 1, wherein the plurality of EDC data objects are organized in a plurality of files.

8. The system of claim 1, wherein the first EDC data object is stored at a first location of a first file and the second EDC data object is stored at a second location of the first file.

9. The system of claim 1, further comprising:
a second relationship object that represents a relationship between the first EDC object and a third EDC object; and
a third relationship object that represents a relationship between the second EDC object and the third EDC object.

10. The system of claim 1, wherein the executable code is configured to display the plurality of relationship objects in a table format.

11. The system of claim 1, wherein the executable code is configured to display the plurality of relationship objects in a tree format.

12. The system of claim 1, wherein the plurality of relationship objects includes a second relationship object that describes a functional relationship between the first EDC data object and the second EDC data object.

13. The system of claim 1, wherein the plurality of relationship objects includes a second relationship object that describes a matching relationship between different ones of the plurality of EDC data objects.

14. The system of claim 1, wherein the executable code is configured to identify and display a synchronization status related to a relationship object.

15. The system of claim 1, wherein the processor, display, and input device comprise a client computer.

16. The system of claim 1, further comprising a plurality of metadata objects corresponding to the plurality of EDC data objects, wherein the metadata objects represent at least one of the following: date created, date last modified, user responsible for last modification, life-cycle phase, and synchronization status.

17. The system of claim 1, wherein at least one of the plurality of relationship objects is defined by a metadata object that represents a life-cycle phase of one of the plurality of EDC data objects.

18. The system of claim 1, wherein the executable code is configured to track and display prior revisions of the EDC data objects.

19. The system of claim 1, wherein the first value of the first EDC data object is different than the second value of the second EDC data object.

20. The system of claim 19, wherein the first value is defined by the first user during a first project phase, and wherein the second value is defined by the second user during a second project phase.

21. The system of claim 19, wherein the first user is different than the second user.

* * * * *